G. Dixon.
Lubricator.

Nº 12,859.          Patented May 15, 1855.

UNITED STATES PATENT OFFICE.

GEORGE DIXON, OF LA FAYETTE, INDIANA.

VELOCITROT-LUBRICATOR.

Specification of Letters Patent No. 12,859, dated May 15, 1855.

*To all whom it may concern:*

Be it known that I, GEORGE DIXON, of La Fayette, in the county of Tippecanoe and State of Indiana, have invented a new and useful Improvement in Oil-Cups for Supplying Lubricating Material to Crank-Pins of Locomotive and other Engines; and I do hereby declare that the following is a full, clear, and exact description of the same, reference being had to the accompanying drawings, forming part of this specification, in which—

Figure 1:
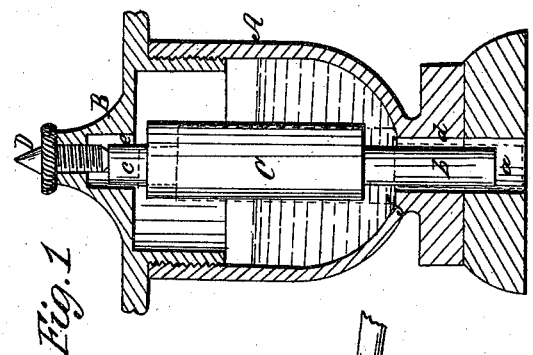
Figure 2:
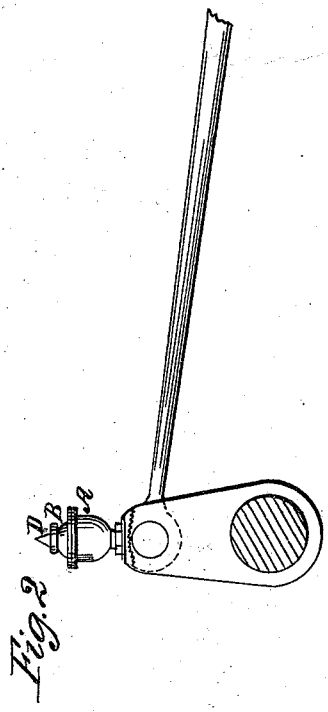

Figure 1, is a vertical central section of an oil cup constructed after my invention. In this view the supply valve is shown open, by black lines and closed by red lines. Fig. 2, is a side elevation of the same applied to the connecting rod of an engine, it being arranged directly over the crank pin.

Similar letters of reference indicate corresponding parts in the two figures.

This invention relates to an improvement in that description of oil cup which supplies lubricating material to the crank pins of locomotive and other engines through the agency of the rapid motion of the connecting rod.

The nature of the improvement above adverted to consists, 1st, in providing a stem valve within the oil cup and so constructing and arranging the same that it shall be caused to rise slightly at every downward motion of the connecting rod, owing to the movement of said rod being quicker than the motion due to gravity, and thereby open the discharge, at the bottom of the cup, and allow oil to escape upon the crank pin, and after thus lubricating the crank pin shall fall by its own gravity, close the discharge and shut off the flow of oil, until the connecting rod commences to make another downward stroke.

To enable others to fully understand, and to make and use my invention, I will proceed to describe it more minutely.

A, is the oil cup arranged on the connecting rod as shown directly over the crank pin; B, is the screw top or cover, C, the valve and D, the screw for regulating the movement of said valve. $a$, is the discharge through which the oil passes from the cup to the crank pin. The valve C, is made with two stems $b$, $c$, of triangular shape which fit in guides $d$, $e$, formed in the top and bottom of the cup. By these stems the valve is always kept in its place and as the stem $b$, is of triangular shape the oil has a chance to escape when the valve is raised off its seat $f$, as shown in black.

Operation: As the connecting rod moves back and forth it causes the oil cup which is attached fast to it to move with great velocity and in doing so the valve is, by reason of the motion of the connecting rod being quicker than gravitation, caused momentarily to be suspended, and while thus suspended the oil flows through the discharge upon the crank pin. By the time sufficient oil has escaped the valve falls and checks the supply. When it is desired to increase the quantity supplied the screw must be turned to the right and vice versa, when it is desired to lessen the quantity.

By my invention a constant but at the same time not too liberal a supply of oil is kept up, and the necessity of employing a wick which is liable to become clogged by the oil becoming gummy and in time prevent the crank pin being properly lubricated, is avoided.

What I claim as my invention and desire to secure by Letters Patent, is—

Providing oil cups of crank pins, and other movable journals with a valve, C, constructed, arranged and operating substantially as herein described.

GEORGE DIXON.

Witnesses:
THOMPSON W. GRAHAM,
WM. ARMSTRONG.